United States Patent Office 3,829,428
Patented Aug. 13, 1974

3,829,428
PROCESS FOR THE CATALYTIC VAPOR-PHASE SYNTHESIS OF ALKYLPYRIDINES
Charles W. Hargis, Johnson City, Tenn., assignor to Eastman Kodak Company, Rochester, N.Y.
No Drawing. Filed Sept. 1, 1972, Ser. No. 285,789
Int. Cl. C07d 31/08
U.S. Cl. 260—290 P      3 Claims

ABSTRACT OF THE DISCLOSURE

Process for the vapor-phase production of 2- and 4-picoline which comprises contacting a mixture of ammonia and acetaldehyde in the vapor-phase at an elevated temperature in the presence of a catalyst of silica-alumina and a co-catalyst selected from lithium phosphate, niobium pentoxide, tantalum pentoxide, bismuth trioxide, antimony (IV) oxide, or a mixture of antimony (IV) oxide and postassium oxide.

---

This invention relates to an improved method for the production of alkylpyridines. More particularly, this invention relates to the vapor-phase interaction of an aliphatic aldehyde and ammonia in the presence of a catalyst comprising silica gel promoted with alumina, the improvement comprising carrying out the reaction in the presence of a co-catalyst selected from the group consisting of lithium phosphate, niobium pentoxide, tantalum pentoxide, bismuth trioxide, antimony (IV) oxide, or a mixture of antimony (IV) oxide and potassium oxide.

Alkyl homologs of pyridine are important intermediates and solvents useful in the synthesis of antihistamines, sulfa drugs, mildew-proofing agents, antimalarials, quaternary germicides, and comonomers. The alkyl homologs of pyridine substituted in the 4-position, such as 4-picoline, have been used to produce isonicotinic acid, which is an important intermediate in the production of drugs having antitubercular properties. The alkylpyridines which are substituted in the 2- and 4-positions are in particular demand because they can be readily converted to corresponding vinyl analogs which are finding increasing application as comonomers in rubber and synthetic fibers.

Known methods for the synthesis of alkylpyridines consist of the interaction of acetaldehyde with ammonia in the vapor-phase over a dehydrating catalyst consisting largely of silica gel, alumina, or a mixture containing up to 2 percent alumina on silica gel. The resulting reaction has been reported to yield 2-picoline, 4-picoline, 2-methyl-5-ethylpyridine, and a high boiling fraction known to contain pyridine compounds. See, for example, U.S. 2,698,849, U.S. 3,284,456 and A. Nenz and M. Pieroni, *Hydrocarbon Processing*, 47 (12), 104 (1968). It has been found that the activity of silica-alumina is greatly enhanced by the promoting action of the above-mentioned co-catalysts. Therefore, it is an object of this invention to provide a process for the production of alkylpyridines.

It is another object of this invention to provide a process for producing alkylpyridines wherein heretofore undisclosed promoting agents are employed to obtain increased activity and selectivity of the catalyst.

It is a further object of this invention to provide a process for the selective vapor-phase condensation of acetaldehyde and ammonia to produce 2- and 4-picolines while employing catalysts comprising a silica-alumina base promoted by lithium phosphate, niobium pentoxide, tantalum pentoxide, bismuth trioxide, antimony (IV) oxide, or a mixture of antimony (IV) oxide and potassium oxide.

In carrying out the process of this invention, the catalyst and co-catalyst are contacted with a mixture of acetaldehyde and ammonia in a molar ratio of 1:0.33–5, preferably 1:0.5–3 at a temperature of from about 250° C. to 650° C., preferably 300° C. to 550° C., for a contact time sufficiently long to substantially complete the reaction. The contact time may be varied from about 0.1 to 50 seconds, preferably 0.5 to 25 seconds. Contact time is defined as the time required for the feed mixture to fill a volume equal to the bulk volume of the catalyst at the temperature and pressure employed in the operation. The reaction may be carried out in any apparatus suitable for bringing the reactants and the catalyst into intimate contact, such as, for example, a tubular fixed-bed reactor or a fluidized-bed reactor. The effluent from the reactor containing the alkylpyridines may then be collected by methods well known to the art and separated into pure individual components by conventional means such as by distillation.

The catalyst may be any known *per se* as useful in the production of 2- and 4-picolines from acetaldehyde and ammonia. Examples of useful catalysts are silica, alumina, silica-alumina, silica magnesia, etc., among which silica-alumina is preferred. The content of alumina in the silica-alumina catalyst may vary over a wide range, for example from 0.1 to about 50 weight percent. The improvement and advantageous results which are obtained by the use of this invention are obtained through the addition of a co-catalyst selected from lithium phosphate, niobium pentoxide, tantalum pentoxide, bismuth trioxide, antimony (IV) oxide, or a mixture of antimony (IV) oxide and potassium oxide to the main catalyst. The amount of the co-catalyst may be in an amount of 0.1 to 25 percent by weight, based on the total weight of the catalyst, preferably 0.1 to 15 percent.

The addition of the co-catalyst to the main catalyst, e.g., silica-alumina, may be conducted by a conventional manner such as coprecipitation or by impregnation.

For example, the niobium pentoxide promoted catalyst may be prepared by impregnating the support with niobium oxalate solution, evaporating water and firing the catalyst at 450° C. to decompose the oxalate into the pentoxide. Alternatively, the support may be treated with a hydrochloric acid solution of niobium pentachloride which is subsequently hydrolyzed with water. The mixture is washed free of halide ion and calcined in air to give the oxide on the support. The tantalum pentoxide co-catalyst may be prepared in a similar manner. The lithium phosphate promoted catalyst may be prepared by consecutive treatments of the support with aqueous solutions of lithium hydroxide and phosphoric acid to form the orthophosphate on the silica-alumina. Alternatively, the lithium hydroxide impregnated support may be treated with a solution of a water-soluble phosphate salt, such as sodium ortho-phosphate, to precipitate the promoter on the carrier. The catalyst containing the antimony oxide-potassium oxide mixture is readily prepared by treating the support with an aqueous solution of potassium pyroantimonate, evaporating water, and firing the mixture at 780° C. Compositions containing the antimony oxide alone as a promoting agent may be prepared by impregnating the support with a soluble complex containing antimony, for example a tartaric acid complex, or by treating the silica-alumina with a solution of antimony triacetate, followed in each case by calcination of the mixture in air to obtain the desired oxide form of the antimony on the support. The gaseous reactants, i.e., ammonia and acetaldehyde, and inert diluent, for example nitrogen, if used, are preheated, mixed and brought into contact with the catalyst at a suitable temperature for producing the desired reaction.

Generally, the reaction is carried out under ordinary or atmospheric pressure for economic reasons, but may be carried out under superatmospheric or subatmospheric pressure if desired or necessary.

The effluent gas discharged from the reactor after the reaction may be treated in a conventional manner to recover the desired pyridine bases. Thus, for example, the discharged gaseous product is condensed and the oily layer is separated and dried over a drier such as solid alkali hydroxide, and then distilled fractionally to obtain 2-picoline and 4-picoline in the pure state.

This invention can be further illustrated by reference to the following examples.

EXAMPLE 1

During a period of three hours a 50 ml. sample of granular silica-alumina (13% $Al_2O_3$) contained in a 1-inch O.D. Vycor tubular reactor 33 inches long and heated at 450° C., is contacted with a mixture of ammonia, acetaldehyde, and nitrogen in a molar ratio of 1.55:1:0.87 at a contact time of 2 seconds. The reactor effluent is collected in receivers, cooled to about 10° C. and about —80° C. The aqueous organic reaction product is extracted with benzene and after stripping off excess ammonia, the product in benzene solution is analyzed by gas chromatography. The results of the analysis show that the aldehyde feed is completely consumed in the reaction, giving a yield of 18.4% of 2-picoline, 15% of 4-picoline, and 11.7% of other pyridines based on acetaldehyde. Other pyridines included pyridine, 5-ethyl-2-methylpyridine, 4-ethyl-3-methylpyridine, and 4-ethyl-2-methylpyridine.

EXAMPLE 2

The experiment of Example 1 is repeated except the molar ratio of ammonia:acetaldehyde:nitrogen is 1:1:1.2. Following collection, processing, and analysis of the product as in Example 1, it is found that the yield of 2-picoline is 15.5%, of 4-picoline is 14.1%, and the yield of other pyridines is 10.1%.

EXAMPLE 3

The experiment of Example 2 is repeated except the catalyst contains 10% by weight of lithium phosphate deposited on the silica-alumina base. Collection, processing, and analysis of the product as in Examples 1 and 2 showed that 2-picoline had been produced in 24.2% yield, 4-picoline in 25.3% yield, and other pyridines in 13% yield. Thus, the promoting action of the lithium phosphate results in a significant increase in the production of alkylpyridines.

EXAMPLE 4

The experiment of Example 2 is repeated except the catalyst consists of 10% niobium pentoxide on the silica-alumina support. Following collection, processing, and analysis of the product as in the foregoing examples, the yield of 2-picoline is found to be 20.2%, of 4-picoline 18.5%, and the yield of other pyridines is 13%.

EXAMPLE 5

The experiment of Example 2 is repeated except that the silica-alumina based catalyst contains antimony and potassium in amounts corresponding to 9.6% antimony (IV) oxide and 5.9% potassium oxide. Analysis of the alkylpyridine product after collection, as before, shows yields of 2-picoline, 4-picoline, and other pyridines amounting to 31.9%, 26.3%, and 9.7%, respectively. Thus, the action of the promoted catalyst resulted in substantially increased production of both picoline isomers while production of the valuable 2-picoline isomer predominated.

EXAMPLE 6

The experiment of Example 2 is repeated except that the catalyst consists of 10% tantalum pentoxide on the silica-alumina support. Following collection, processing, and analysis of the product as in the foregoing examples, the yield of 2-picoline is found to be 17.4%, of 4-picoline 22.0%, and the yield of other pyridines is 7.6%.

Although the invention has been described in considerable detail with particular reference to certain preferred embodiments thereof, variations and modifications may be effected within the spirit and scope of the invention.

I claim:

1. In a process for the production of 2- and 4-picoline which comprises contacting a reaction mixture of ammonia and acetaldehyde in the vapor-phase at an elevated temperature in the presence of a catalyst comprising silica gel promoted with alumina, the improvement comprising carrying out the reaction in the presence of a co-catalyst selected from the group consisting of lithium phosphate, niobium pentoxide, bismuth trioxide, antimony (IV) oxide, or a mixture of antimony (IV) oxide and potassium oxide.

2. The process of Claim 1 wherein the co-catalyst is added in an amount of from 0.1 to 15 percent by weight, based on the total weight of the catalyst.

3. The process of Claim 2 wherein the co-catalyst is a mixture of antimony (IV) oxide and potassium oxide.

References Cited

UNITED STATES PATENTS 2,184,235   12/1939   Groll et al. _____ 260—290

HARRY I. MOATZ, Primary Examiner